3,560,221
SODIUM STEARYL FUMARATE IN CHEMICALLY LEAVENED BAKERY PRODUCTS

Carl P. Hetzel, Bellerose, and Philip F. Schamberger, Jr., East Northport, N.Y., assignors to Pfizer Inc.
No Drawing. Continuation-in-part of application Ser. No. 619,177, Feb. 28, 1967. This application Sept. 17, 1969, Ser. No. 858,848
Int. Cl. A21d 2/16, 13/08
U.S. Cl. 99—92          4 Claims

ABSTRACT OF THE DISCLOSURE

Sodium stearyl fumarate in chemically leavened cake formulations prevents the adverse effects ordinarily encountered at increased sugar levels and reduced shortening levels.

CROSS REFERENCE TO RELATED APPLICATION

This application is a continuation-in-part of copending application Ser. No. 619,177, filed Feb. 28, 1967 and now abandoned.

BACKGROUND OF THE INVENTION

Increased tolerance to recipe variations in cake products is constantly sought, to minimize failure resulting from measurement inaccuracy and also to permit change desirable from the standpoints of lower cost and improved quality. High sugar levels afford enhanced aging stability and improved taste, but usually demand high levels of costly shortening and eggs to build an acceptable cake structure. When high sugar levels are employed with lean (low-shortening) recipes, inferior cake volume and contour ordinarily result. Such cakes are unacceptably dense, and frequently exhibit the dipped surface typical of a baking failure.

SUMMARY OF THE INVENTION

Now it has been discovered that inclusion of a minor proportion of sodium stearyl fumarate in high-sugar, low-shortening, chemically leavened bakery products overcomes the described shortcomings and provides low-cost, high-quality cakes of excellent volume and contour.

DETAILED DESCRIPTION OF THE INVENTION

The chemically leavened bakery products which benefit from the new discovery are those comprising flour, sugar, shortening and food emulsifier in such weight proportion that the sugar to flour ratio exceeds about 0.9 and the shortening to flour ratio is less than about 0.25. Such products, as distinguished from yeast-leavened baked goods, include cakes and cake batters leavened with baking powders, single- or double-acting, containing such well known agents as sodium bicarbonate (making soda) together with acid-reacting substances such as calcium acid phosphate, sodium aluminum sulfate, cream of tartar and tartaric acid, alone or in combination. Other substances may, of course, also be present in the batter, including eggs, egg whites, whole or skim milk, butter milk, sour cream, dry milk solids, salt, vanilla or other flavoring agents as desired, and other conventional baking ingredients which play no direct role in the invention.

The lean formulations which offer significant cost advantages and require the benefit of sodium stearyl fumarate are those having unusually low shortening levels, below 0.25 part by weight for each part by weight of flour. For best results, shortening to flour weight ratios of at least about 0.06 will be employed, and preferably from about 0.06 to about 0.2. Conventional shortening, including vegetable oils, butter, margarine, lard and the like, are satisfactory. Hydrogenated vegetable oils, such as hydrogenated cottonseed oil, and hydrogenated coconut oil, will usually be preferred.

Commercial shortenings ordinarily contain an appropriate food emulsifier, e.g. fatty acid monoglycerides, diglycerides, sorbitan esters, polysorbate esters, glyceryl lactopalmitate, propylene glycol monostearate, and the like. Where these are absent, they may be added. Appropriate levels for best results will vary from about 2 to 50% (based on the shortening) depending on the emulsifier system chosen, as is well known to those skilled in the art. The appended examples illustrate methods for determining the best levels by experiment.

The formulations of the present invention represent weight ratios of sugar to flour greater than about 0.9; ordinarily there will be no added advantage to ratios above about 1.5, and a particularly preferred range embraces ratios of 1.05 to 1.4. Such sugar levels contribute excellent aging characteristics and taste, usually unattainable in lean shortening formulations.

The described advantages are achieved with minor proportions of sodium stearyl fumarate. Concentrations as low as 0.1% by weight, based on the flour, give beneficial effect, and it is unnecessary to employ more than 2%. Levels from about 0.5 to 1% give excellent results and are ordinarily preferred.

Sodium stearyl fumarate may be prepared by various procedures. For example, maleic anhydride may be esterified with a mole of stearyl alcohol, suitably in refluxing toluene. The resulting monoester can then be isomerized to monostearyl fumaric acid with bromine catalyst in the presence of 2,2'-azabis-(2'-methyl-propionitrile) in halogenated solvent such as carbon tetrachloride. Finally, the monoester can be converted to the desired sodium salt by neutralization in acetone with aqueous caustic. The product is an odorless, tasteless white powder which melts at about 238 to 242° C. with decomposition. The appropriate particle size distribution for the present application is one corresponding to at least 50 weight percent between 20 and 53 microns. This particle size distribution is satisfied by the sodium stearyl fumarate employed in the appended examples. It is determined employing an Alpine Air Jet Sieve A 200 as provided with a vacuum source (household vacuum cleaner), furnishing an air current to disperse the material on the sieve and carry the fine fraction through the mesh openings. The fraction coarser than 53 microns is determined by screening 20.00 grams of sample on the 270 mesh screen (8 inches in diameter) for 4 minutes ±5 seconds, then removing the material remaining on the screen by brushing and tapping, and weighing to ±0.02 gram. The fraction through 20 microns is determined by screening 2.9–3.1 grams of sample (weighed to ±0.001 gram) on the 2 micron micromesh screen (3 inches in diameter) as before, but weighing the material remaining on the screen to ±0.001 gram.

The product may be incorporated in prepared cake mixes by blending with the flour, or it can be combined with the other ingredients in any manner desired.

The reason that sodium stearyl fumarate produces the described effects in cake batters is unclear. Its ability to, in effect, replace emulsified shortening is particularly unusual, inasmuch as sodium stearyl fumarate in itself has poor surfactant propeties. Although it is known that this agent is useful as a dough improver and firmness retarding agent in bread doughs, they are quite different in formulation from chemically leavened cake batters. For example, the latter contain substantially less flour, more sugar and much more liquid than bread doughs; and the flour employed in cakes is usually lower in protein content and quality than bread flour.

The following examples are merely illustrative, and are not intended to limit the scope of the invention, which is defined in the appended claims.

Example 1

A lean white cake formulation (16 wt. percent shortening based on flour) is prepared with a high sugar proportion (120 wt. percent based on flour) according to the following schedule:

| Ingredient: | Parts by weight |
|---|---|
| Flour | 100 |
| Sugar | 120 |
| Water | 100 |
| Egg whites (frozen) | 31 |
| Shortening [1] | 16 |
| Skim milk solids | 10 |
| Baking powder [2] | 6 |
| Salt | 3 |

[1] Shortening composition:

| | Wt. percent |
|---|---|
| Hydrogenated vegetable oil (Proctor & Gamble Sweetax) | 77.6 |
| Mono-diglycerides (Atlas Chemical Co. Atmul 500) | 14.8 |
| Sorbitan monostearate (Atlas Chemical Co. Span 60) | 3.8 |
| Polysorbate monostearate (Atlas Chemical Co. Tween 60) | 3.8 |
| | 100.0 |

Shortening preparation: Melt together in a beaker weighed vegetable oil and emulsifiers. Heat with agitation until clear and homogeneous. Chill rapidly in ice bath with agitation, scraping sides of beaker.

[2] The baking powder is Davis double-acting, a blend of sodium bicarbonate, calcium acid phosphate and sodium aluminum sulfate, available from Penick & Ford Ltd. of New York.

The effect of sodium stearyl fumarate is determined by incorporating this ingredient in various proportions by dry blending with the flour. At each level sufficient batter is prepared to produce two cake layers (420 grams per layer) by the following procedure:

Blend dry ingredients in Kitchen Aid mixer. Add emulsified shortening and blend. Add 170 ml. of water while mixing at number 1 speed. Mix 3 minutes and 15 seconds at number 4 speed. Mix egg white with remaining water. Add one-half to cake batter and mix for 2 minutes 40 seconds at speed number 2. Add remaining water and egg, mix 2 minutes at speed 2. Scale at 420 grams per layer. Bake at 350° F. for 26 minutes.

The cakes prepared with sodium stearyl fumarate exhibit superior physical characteristics and enhanced volume, as follows:

No NaSF:
    Volume (cc.) _____ 1125
    Spec. vol. (cc./g.) _____ 2.99
    Batter sp. gr. _____ .658
.25% NaSF:
    Volume _____ 1155
    Spec. vol. _____ 3.03
    Batter sp. gr. _____ .578
.50% NaSF:
    Volume _____ 1230
    Spec. vol. _____ 3.46
    Batter sp. gr. _____ .687
1.0% NaSF:
    Value _____ 1180
    Spec. vol. _____ 3.16
    Batter sp. gr _____ .688

NaSF = Sodium stearyl fumarate.

Example 2

The series of bakes of Example 1 is repeated, this time substituting 130 parts by weight of sugar for 120, with similar results, as follows:

No NaSF:
    Volume (cc.) _____ 982
    Spec. vol. (cc./g.) _____ 2.64
    Batter sp. gr. _____ .762
.25% NaSF:
    Volume _____ 1042
    Spec. vol. _____ 2.72
    Batter sp. gr. _____ .613
.50% NaSF:
    Volume _____ 1105
    Spec. vol. _____ 3.07
    Batter sp. gr. _____ .615
1.0% NaSF:
    Volume _____ 1136
    Spec. vol. _____ 3.12
    Batter sp. gr. _____ .634

Example 3

The series of bakes of Example 1 is again repeated, this time substituting 140 parts by weight of sugar for 120. This time results are even more striking, as follows:

No NaSF:
    Volume (cc.) _____ Severe Dip.
    Spec. vol. (cc./g.) _____ Vol. too small to measure.
    Batter sp. gr. _____ .634.
.25% NaSF:
    Volume _____ 912 (Slight Dip).
    Spec. vol. _____ 2.41.
    Batter sp. gr. _____ .628.
.50% NaSF:
    Volume _____ 1005 (Very Slight Dip).
    Spec. vol. _____ 2.79.
    Batter sp. gr. _____ .698
1.0% NaSF:
    Volume _____ 1048.
    Spec. vol. _____ 2.81.
    Batter sp. gr. _____ .712.

Example 4

The foregoing studies are repeated in a formulation containing 20 parts by weight of shortening and 105 parts by weight of sugar, with all other ingredients as specified in Example 1. Following the procedures of that example, the following results are obtained:

No NaSF:
    Volume (cc.) _____ 1216
    Spec. vol. (cc./g.) _____ 3.12
    Batter sp. gr. _____ .716
.25% NaSF:
    Volume _____ 1283
    Spec. vol. _____ 3.39
    Batter sp. gr. _____ .674
.50% NaSF:
    Volume _____ 1207
    Spec. vol. _____ 3.19
    Batter sp. gr. _____ .682
1.0% NaSF:
    Volume _____ 1255
    Spec. vol. _____ 3.41
    Batter sp. gr. _____ .662

Example 5

Example 4 is repeated (20% shortening), this time employing 140 parts by weight of sugar, with results as follows:

No NaSF:
    Volume (cc.) _____ [1] 860
    Spec. vol. (cc./g.) _____ 2.27
    Batter sp. gr. _____ .778

.25% NaSF:
  Volume _____ 924
  Spec. vol. _____ 2.50
  Batter sp. gr. _____ .742
.50% NaSF:
  Volume _____ 1092
  Spec. vol. _____ 2.96
  Batter sp. gr. _____ .782
1.0% NaSF:
  Volume _____ 995
  Spec. vol. _____ 2.68
  Batter sp. gr. _____ .664

[1] Slight dip.

Examples 6–11

Additional studies are conducted to investigate the effect of 0.5% sodium stearyl fumarate (by weight based on flour) in a high-sugar (140 parts by weight) white cake formulation, with ingredients and procedures as before. Shortening levels are decreased from 20 to 6 parts by weight, holding other weights unchanged, with results as follows:

| Example | Shortening parts by weight | Batter gravity | Temp., °F. | Cake volume, cc. | Cake specific volume, cc./g. | Comments |
|---|---|---|---|---|---|---|
| 6 | 20, Control | .615 | 80 | 968 | 2.60 | Dipped contour |
|   | 20 plus NaSF | .642 | 81 | 1,124 | 3.06 | Good contour. |
| 7 | 16, Control | .634 | 79 | 955 | 2.59 | Dipped contour. |
|   | 16 plus NaSF | .630 | 84 | 1,111 | 2.99 | Good contour. |
| 8 | 12, Control | .750 | 83 | 824 | 2.23 | Dipped contour. |
|   | 12 plus NaSF | .718 | 84 | 1,118 | 3.10 | Good contour. |
| 9 | 10, Control | .764 | 81 | Not measurable | | Dipped contour. |
|   | 10 plus NaSF | .737 | 79 | 1,105 | 3.01 | Good contour. |
| 10 | 8, Control | .852 | 75 | Not measurable | | Dipped contour. |
|    | 8 plus NaSF | .834 | 75 | 1,024 | 2.79 | Good contour. |
| 11 | 6, Control | .932 | 75 | Not measurable | | Dipped contour |
|    | 6 plus NaSF | .884 | 76 | 924 | 2.47 | Good contour. |

From the table it is seen that 0.5% sodium stearyl fumarate provides improved contour and better volume over the entire shortening range tested.

Examples 12–14

Further studies are conducted to investigate the effect of sodium stearyl fumarate with laboratory-prepared shortenings containing glyceryl lactopalmitate at various levels. Tests are based on a lean white cake formulation (20% shortening—140% sugar):

Part by weight
Flour _____ 100
Sugar _____ 140
Water _____ 100
Egg whites (frozen) _____ 31
Shortening [1] _____ 20
Skim milk solids _____ 10
Baking powder [2] _____ 6
Salt _____ 3

[1] Shortening compositions (wt. percent):

|  | Example |  |  |
|---|---|---|---|
|  | 12 | 13 | 14 |
| Hydrogenated vegetable oil (Baker's Best-Capital City Prod. Co.) | 77.5 | 75.5 | 73.5 |
| Distilled monoglycerides (Myverol 1800-DPI Div. Eastman Chem.) | 20.5 | 20.5 | 20.5 |
| Glyceryl lactopalmitate | 2.0 | 4.0 | 6.0 |
| Total | 100 | 100 | 100 |

[2] The baking powder is Davis double-acting, as in Example 1.

The tests of Examples 12–14 are repeated, substituting Example 1, and the effect of sodium stearyl fumarate (0.5 wt. percent on flour) is explored by the blending and baking procedures of the previous examples, with results as follows:

| Shortening | Cake specific volume, cc./g. |
|---|---|
| Example: | |
| 12 ― 2% glyceryl lactopalmitate, control | 2.92 |
| 2% glyceryl lactopalmitate, plus NaSF | 3.20 |
| 13 ― 4% glyceryl lactopalmitate, control | 2.95 |
| 4% glyceryl lactopalmitate, plus NaSF | 3.12 |
| 14 ― 6% glyceryl lactopalmitate, control | 2.74 |
| 6% glyceryl lactopalmitate, plus NaSF | 3.10 |

In each case, 0.5% sodium stearyl fumarate leads to enhanced cake volume.

Examples 15–17

The tests of Examples 12–14 are repeated, substituting 12 parts by weight of shortening for 20 parts, with results as follows:

| Shortening | Cake specific volume, cc./g. |
|---|---|
| Example: | |
| 15 ― 2% glyceryl lactopalmitate, control | 2.64 |
| 2% glyceryl lactopalmitate, plus NaSF | 3.23 |
| 16 ― 4% glyceryl lactopalmitate, control | 2.72 |
| 4% glyceryl lactopalmitate, plus NaSF | 2.73 |
| 17 ― 6% glyceryl lactopalmitate, control | 2.49 |
| 6% glyceryl lactopalmitate, plus NaSF | 3.05 |

As shortening level is reduced to 12%, control cakes decrease markedly in volume whereas those containing the fumarate maintain very acceptable volume.

Examples 18–20

The tests of Examples 12–14 are again repeated, this time substituting 6 parts by weight of shortening for 20 parts, with results as follows:

| Shortening | Cake specific volume, cc./g. |
|---|---|
| Example: | |
| 18 ― 2% glyceryl lactopalmitate, control | [1] 2.05 |
| 2% glyceryl lactopalmitate, plus NaSF | 2.87 |
| 19 ― 4% glyceryl lactopalmitate, control | 2.05 |
| 4% glyceryl lactopalmitate, plus NaSF | 2.73 |
| 20 ― 6% glyceryl lactopalmitate, control | 2.03 |
| 6% glyceryl lactopalmitate, plus NaSF | 2.58 |

[1] One layer not measurable.

With this further reduction of the shortening level to 6%, control cakes drop sharply in specific volume, whereas those containing 0.5% sodium stearyl fumarate continue to maintain superior volume.

Examples 21–23

The procedure of Examples 18–20 is duplicated (6% shortening-140% sugar), this time substituting the following three propylene glycol monostearate-containing shortenings for those of Examples 12–20:

|  | Wt. Percent Example | | |
|---|---|---|---|
|  | 21 | 22 | 23 |
| Hydrogenated vegetable oil (Baker's Best, Capital City Prod. Co.) | 72.5 | 65.5 | 58.5 |
| Distilled monoglycerides (Myverol 1800, DPI Div. Eastman Chem.) | 20.5 | 20.5 | 20.5 |
| Propylene glycol monostearate | 7.0 | 14.0 | 21.0 |
| Total | 100 | 100 | 100 |

The specific volumes of the resulting cakes are as follows:

| Example | Shortening | Cake specific volume, cc./g. |
|---|---|---|
| 21 | 7% propylene glycol monostearate, control | (1) |
|  | 7% propylene glycol monostearate, plus NaSF | 3.09 |
| 22 | 14% propylene glycol monostearate, control | 2.41 |
|  | 14% propylene glycol monostearate, plus NaSF | 2.86 |
| 23 | 21% propylene glycol monostearate, control | 1.91 |
|  | 21% propylene glycol monostearate, plus NaSF | 2.94 |

[1] Not measurable.

With this shortening system, 0.5% sodium stearyl fumarate again provides acceptable cake volumes, whereas the control cakes are seriously deficient in volume.

Examples 24–26

The foregoing studies involved shortening systems containing monoglycerides. Further experiments are now conducted with hydrogenated vegetable oil containing 14% by weight propylene glycol monostearate without the addition of monoglycerides. Cake formulations and procedures employed are the same as those of Examples 12–20 (140% sugar with 20%, 12% and 6% shortening by weight based on the flour). The effect of 0.5 and 1.0% sodium stearyl fumarate by weight based on the flour is determined to be as follows:

|  | Cake Specific Volume cc./g. |
|---|---|
| Example: | |
| 24 ——————6% Shortening: | |
| Control | 2.02 |
| NaSF, 0.5% | 2.60 |
| NaSF, 1.0% | 2.81 |
| 25 ——————12% Shortening: | |
| Control | 2.30 |
| NaSF, 0.5% | 2.63 |
| NaSF, 1.0% | 2.98 |
| 26 ——————20% Shortening: | |
| Control | 2.54 |
| NaSF, 0.5% | 3.02 |
| NaSF, 1.0% | 2.79 |

Results are similar to those observed in the earlier studies, although cake volumes are somewhat smaller because of the absence of monoglycerides. Control cakes suffer severely in volume as shortening levels are reduced from 20 to 6%. Volume and general physical characteristics of cakes containing sodium stearyl fumarate remain distinctly better than controls at each shortening level, with particularly good physical stability obtained with 1.0% of the fumarate.

Example 27

The effects of sodium stearyl fumarate concentration are further examined in the cake formulation of Example 13 (140% sugar—20% shortening), this time employing hydrogenated vegetable oil shortening containing 4% by weight glyceryl lactopalmitate without the addition of monoglycerides:

|  | Batter Gravity Specific | Volume, Cake Specific Volume, cc./g. |
|---|---|---|
| Control | .961 | (1) |
| 0.5%, NaSF | .970 | 2.75 |
| 1.0%, NaSF | .930 | 2.86 |
| 1.5%, NaSF | .929 | 2.83 |
| 2.0%, NaSF | .954 | 2.76 |

[1] Not measurable.

In this series, optimum results are obtained with 1.0% sodium stearyl fumarate by weight based on flour, with no added benefit realized at the higher levels.

Example 28

The effect of sodium stearyl fumarate in a prior-art, high-shortening white cake formulation beyond the scope of the present invention is investigated in the following recipe:

|  | Grams |
|---|---|
| Cake flour | 219 |
| Sugar | 291 |
| Water | 202 |
| Shortening [1] | 100 |
| Milk solids (non-fat) | 15.6 |
| Baking powder [2] | 14 |
| Salt | 7 |
| Egg whites | 113 |

[1] Covo (Registered trademark of Procter & Gamble Co. for a plastic all-purpose vegetable shortening agent).
[2] Standard double-acting baking powder containing corn starch, sodium bicarbonate, calcium acid phosphate and sodium aluminum sulfate.

The dry ingredients are blended together for three minutes at No. 1 speed in a Hobart Kitchen Aid Mixer. This is followed by addition of the shortening, egg whites and water to the mix in one batch followed by agitation of the whole at No. 2 speed for 1.5 minutes, stopping each half minute to scrape down the bowl. Then 425 grams of batter is scaled into an 8 inch round cake pan and baked at 375° F. for 26 minutes. The procedure is repeated employing sodium stearyl fumarate at 0.5 and 1% levels, based on flour, dry-blended with the flour at the start, with results as follows:

|  | Specific volume |
|---|---|
| Control | 1.94 |
| 0.5% NaSF | 2.20 |
| 1% NaSF | 2.38 |

This recipe is beyond the scope of the present invention by virtue of its high shortening to flour ratio (about 0.46) and the absence of a food emulsifier. As can be seen by comparison of the test results with those of the previous examples, all of these cakes are unacceptably dense. The control cake is tough and exhibits poor grain. The inclusion of sodium stearyl fumarate affords a small improvement in these properties, but none of the three cakes is of commercially acceptable quality.

Examples 29–31

The following formulations are blended and baked as in Example 1, producing cakes superior to those obtained without sodium stearyl fumarate.

|  | Example | | |
|---|---|---|---|
|  | 29 | 30 | 31 |
| Flour | 100 | 100 | 100 |
| Sugar | 150 | 140 | 100 |
| Water | 110 | 100 | 100 |
| Egg whites (frozen) | 31 | 31 | 31 |
| Shortening [1] | 20 | 20 | 20 |
| Skim milk solids | 10 | 10 | 10 |
| Baking powder, double acting | 6 | 6 | 6 |
| Salt | 3 | 3 | 3 |
| Sodium stearyl fumarate | 1.0 | 0.1 | 0.5 |

[1] Shortening composition as in Example 1.

What is claimed is:

1. A chemically leavened bakery product having a reduced shortening content, comprising flour, sugar, shortening and food emulsifier, the sugar to flour ratio exceeding about 0.9 and the shortening to flour ratio being less than about 0.25, said product containing at least about 0.1 weight percent, based on the weight of said flour, of sodium stearyl fumarate having a particle size distribution corresponding to at least 50 weight percent between 20 and 53 microns.

2. The product of claim 1 having a sugar to flour ratio of up to about 1.5.

3. The product of claim 1 having a shortening to flour ratio of at least about 0.06.

4. The product of claim 1 containing up to about 2% sodium stearyl fumarate by weight of said flour.

References Cited

UNITED STATES PATENTS 3,343,964   9/1967   Thomas _____ 99—91X

RAYMOND N. JONES, Primary Examiner

J. R. HOFFMAN, Assistant Examiner